(12) United States Patent
Matsuura et al.

(10) Patent No.: US 12,531,635 B2
(45) Date of Patent: Jan. 20, 2026

(54) OPTICAL TRANSMITTER AND BIAS CONTROL METHOD

(71) Applicant: Fujitsu Limited, Kawasaki (JP)

(72) Inventors: Hideyuki Matsuura, Sendai (JP); Kosuke Komaki, Kawasaki (JP); Hidetoshi Sato, Kawasaki (JP); Katsutoshi Ishidou, Tooda (JP)

(73) Assignee: Fujitsu Limited, Kawasaki (JP)

( * ) Notice: Subject to any disclaimer, the term of this patent is extended or adjusted under 35 U.S.C. 154(b) by 245 days.

(21) Appl. No.: 18/228,751

(22) Filed: Aug. 1, 2023

(65) Prior Publication Data
US 2024/0120996 A1  Apr. 11, 2024

(30) Foreign Application Priority Data
Sep. 30, 2022  (JP) .................................. 2022-158005

(51) Int. Cl.
*H04B 10/079* (2013.01)
*H04B 10/54* (2013.01)

(52) U.S. Cl.
CPC .................. *H04B 10/07955* (2013.01); *H04B 10/07957* (2013.01); *H04B 10/541* (2013.01)

(58) Field of Classification Search
CPC ........ H04B 10/07955; H04B 10/07957; H04B 10/50575; H04B 10/541
See application file for complete search history.

(56) References Cited

U.S. PATENT DOCUMENTS

| | | | | |
|---|---|---|---|---|
| 5,161,044 | A * | 11/1992 | Nazarathy | H04B 10/50575 398/198 |
| 9,184,834 | B1 * | 11/2015 | Zhang | H04B 10/50577 |
| 9,819,412 | B1 * | 11/2017 | Shankar | H04B 10/50575 |
| 2008/0013881 | A1 * | 1/2008 | Welch | G02B 6/12004 385/14 |
| 2008/0138088 | A1 * | 6/2008 | Welch | H01S 5/026 398/183 |

(Continued)

FOREIGN PATENT DOCUMENTS

| | | |
|---|---|---|
| JP | 2009-265283 | 11/2009 |
| JP | 2012-257164 | 12/2012 |
| JP | 2021-67933 | 4/2021 |

OTHER PUBLICATIONS

Yejun Fu et al., " Mach-Zehnder: A Review of Bias Control Techniques for Mach-Zehnder Modulators in Photonic Analog Links," Nov. 18, 2013, IEEE Microwave Magazine ( vol. 14, Issue: 7, Nov.-Dec. 2013),pp. 1-6.*

(Continued)

*Primary Examiner* — Omar S Ismail
(74) *Attorney, Agent, or Firm* — Fujitsu Intellectual Property Center (57) ABSTRACT

An optical transmitter includes: an optical modulator of a Mach-Zehnder type using an InP-based material; a bias controller configured to control a DC bias applied to the optical modulator; a monitor configured to monitor output light of the optical modulator to generate a monitor signal; and a corrector configured to correct a gain of the monitor signal in a direction in which wavelength dependency of insertion loss of the optical modulator is compensated according to a wavelength at a preceding stage of bias control by the bias controller.

10 Claims, 10 Drawing Sheets

(56) References Cited

U.S. PATENT DOCUMENTS

| | | | | |
|---|---|---|---|---|
| 2009/0232517 | A1* | 9/2009 | Farina | H04B 10/50572 359/239 |
| 2011/0008039 | A1* | 1/2011 | Welch | H01S 5/4025 398/1 |
| 2011/0013907 | A1* | 1/2011 | Sugihara | G02F 1/0123 398/38 |
| 2011/0129230 | A1* | 6/2011 | Zanoni | H04B 10/677 398/140 |
| 2014/0334829 | A1* | 11/2014 | Akiyama | H04B 10/50575 398/186 |
| 2015/0372781 | A1* | 12/2015 | Frankel | H04B 10/506 398/79 |
| 2016/0156418 | A1* | 6/2016 | Yamanaka | H04B 10/50575 398/38 |
| 2016/0337042 | A1* | 11/2016 | Zhang | H04B 10/564 |
| 2017/0194310 | A1* | 7/2017 | Evans | G02F 1/2255 |
| 2017/0237500 | A1* | 8/2017 | Nishimoto | H04B 10/532 398/184 |
| 2019/0324298 | A1* | 10/2019 | Dayel | G02F 1/0147 |
| 2020/0301070 | A1* | 9/2020 | Nagarajan | G02B 6/4246 |
| 2021/0119699 | A1 | 4/2021 | Li et al. | |
| 2024/0120996 | A1* | 4/2024 | Matsuura | H04B 10/541 |

OTHER PUBLICATIONS

Larry A. Coldren et al., "High Performance InP-Based Photonic ICs—A Tutorial," Jan. 6, 2011, Journal of Lightwave Technology, vol. 29, No. 4, Feb. 15, 2011, pp. 554-566.*

Thomas Ferrotti et al., "Co-integrated 1.3 μm hybrid III-V/silicon tunable laser and silicon Mach-Zehnder modulator operating at 25Gb/s," Dec. 22, 2016, Optics Express, vol. 24, No. 26 | Dec. 26, 2016, pp. 4-25.*

* cited by examiner

| WAVELENGTH SETTING CH | DPOT SETTING DATA |
|---|---|
| 1 | 0x40 |
| 50 | 0x41 |
| 100 | 0x42 |
| 150 | 0x43 |
| ⋮ | ⋮ |
| 600 | 0x33 |
| 650 | 0x32 |
| 700 | 0x31 |
| 765 | 0x30 |

OPTICAL TRANSMITTER AND BIAS CONTROL METHOD

CROSS-REFERENCE TO RELATED APPLICATIONS

The present application is based upon and claims the benefit of priority of Japanese Patent Application No. 2022-158005 filed on Sep. 30, 2022, the entire contents of which are hereby incorporated by reference.

FIELD

The present disclosure relates to an optical transmitter and a bias control method.

BACKGROUND

In order to meet demands for high-speed and large-capacity communication in recent years, multi-level modulation using an external modulator has been adopted. In core networks, LN modulators using lithium niobate (LN) have been used for a long time. In recent years, InP-based modulators using InP-based materials having a small-size feature as compared to LN modulators have improved in performance, and reached the stage of commercialization. As the InP-based material, for example, InGaAsP, InAlGaAs, and the like are available, and the modulator is formed using a thick film or a multiple quantum well structure of these materials.

In an LN modulator or an optical modulator of a Mach-Zehnder type (MZM) using an InP-based material, a direct current (DC) bias that defines an operating point drifts due to change in temperature, change over the years, and the like. In order to maintain the DC bias at the operating point of the optical modulator, auto bias control (ABC) is practiced.

RELATED ART DOCUMENTS

Patent Documents

[Patent Document 1] Japanese Laid-Open Patent Application No. 2021-67933
[Patent Document 2] Japanese Laid-Open Patent Application No. 2009-265283
[Patent Document 3] Japanese Laid-Open Patent Application No. 2012-257164

In an InP-based optical modulator, a band gap is changed by application of an electric field, and thereby, the optical absorption is changed and the traveling speed of light, i.e., the phase is changed. In other words, the optical absorption property of an InP-based optical modulator has wavelength dependency. Meanwhile, widening of the transmission band of optical communication is in progress, and the operating band of an optical modulator is being expanded. In a high frequency region, it is difficult to expand the band in a state of the power characteristics being maintained, and in general, band compensation is practiced. The band compensation is a process of flattening the gain of the entire band by reducing the gain in a lower frequency band, in order to flatten the wavelength-to-power characteristic in a higher frequency band. This band compensation not only lowers the output level but also causes a variation in loss depending on the amount of compensation. Such loss variation due to the high-frequency band compensation has not been a problem with LN modulators. However, in an optical modulator using an InP-based material, the wavelength dependency of insertion loss is not negligible due to a combination of the loss variation caused by the high-frequency band compensation and the wavelength dependency of the optical absorption characteristics. The wavelength dependency of insertion loss of an InP-based optical modulator also affects the ABC control, which makes it difficult to maintain the DC bias at a correct operating point.

SUMMARY

According to an embodiment in the present disclosure, an optical transmitter includes:
  an optical modulator of a Mach-Zehnder type using an InP-based material;
  a bias controller configured to control a DC bias applied to the optical modulator;
  a monitor configured to monitor output light of the optical modulator to generate a monitor signal; and
  a corrector configured to correct a gain of the monitor signal in a direction in which wavelength dependency of insertion loss of the optical modulator is compensated according to a wavelength at a preceding stage of bias control by the bias controller.

The object and advantages in the embodiment will be realized and attained by means of the elements and combinations particularly pointed out in the claims. It is to be understood that both the foregoing general description and the following detailed description are exemplary and explanatory and are not restrictive of the invention as claimed.

DESCRIPTION OF EMBODIMENTS

Figure 1:
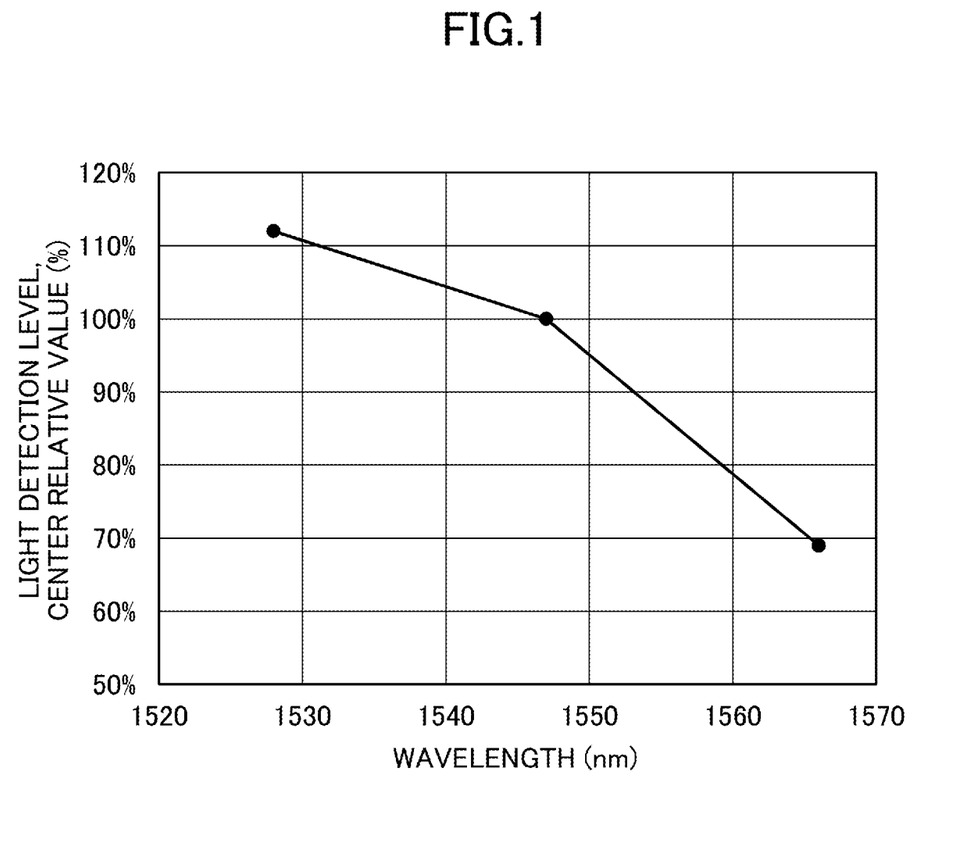
FIG. 1 is a diagram illustrating wavelength dependency of insertion loss of an MZM.

According to an embodiment in the present disclosure, an optical transmitter and a bias control method are implemented in which wavelength dependency of insertion loss is suppressed. Before describing a configuration of an optical transmitter and a bias control method according to an embodiment, wavelength dependency of insertion loss, which is a problem in an optical modulator using an InP-based material, will be described with reference to FIG. 1. In FIG. 1, the horizontal axis represents the wavelength, and the vertical axis represents the relative value (%) of the light detection level with respect to a center wavelength. Insertion loss that occurs when a carrier wave is modulated by an InP-based optical modulator varies significantly with the wavelength. Assuming that the optical detection level is 100% at a center wavelength of 1547 nm within a range of wavelengths from 1528 nm to 1566 nm including the C band, at 1528 nm on the shorter wavelength side, an optical detection level of +10% with respect to the center wavelength is exhibited, whereas at 1565 nm on the longer wavelength side, an optical detection level of −30% with respect to the center wavelength is exhibited at which the insertion loss is great.

The insertion loss of −30% affects the convergence accuracy or convergence time to the optimum bias point of the ABC control. Although the characteristic illustrated in FIG. 1 is an example of measurements on one sample, the insertion loss may vary among devices or among manufacturing lots. Considering such variation among elements or among manufacturing lots, it is considered that the bias of the insertion loss depending on the wavelength becomes even greater.

In an embodiment, the gain of a monitor value used for bias control is adjusted according to the wavelength so as to cancel the wavelength dependency of the insertion loss of an MZM. Embodiments shown below are examples for embodying technical ideas of the present disclosure, and do not limit the contents of the disclosure. The sizes, positional relationships, and the like of constituent elements illustrated in the drawings may be exaggerated to make understanding of the present inventive concept easier. Substantially the same constituent elements or functions are denoted by the same name or reference numeral, and duplicated description may be omitted.

<Configuration of Optical Transceiver Module and Optical Transmitter>

Figure 2:
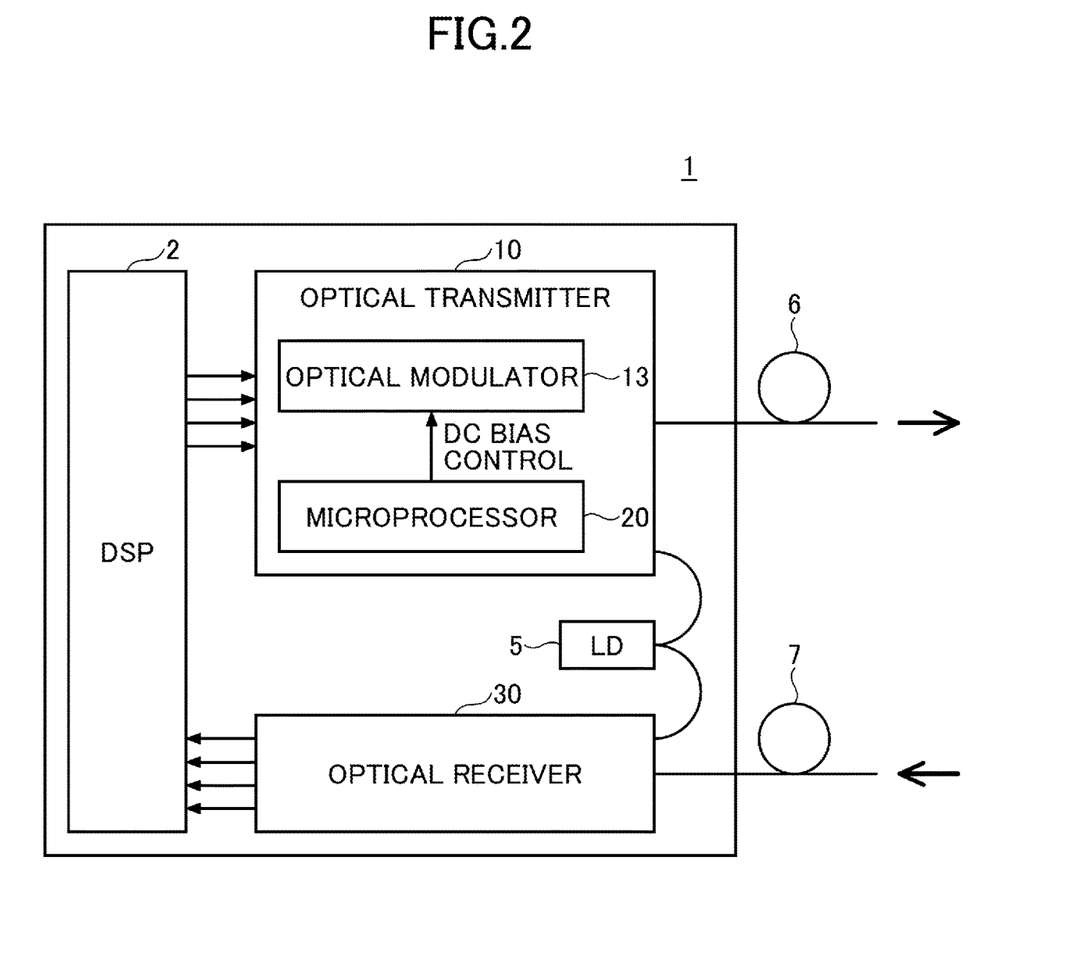
FIG. 2 is a schematic diagram of an optical transceiver module using an optical transmitter according to an embodiment.
Figure 3:
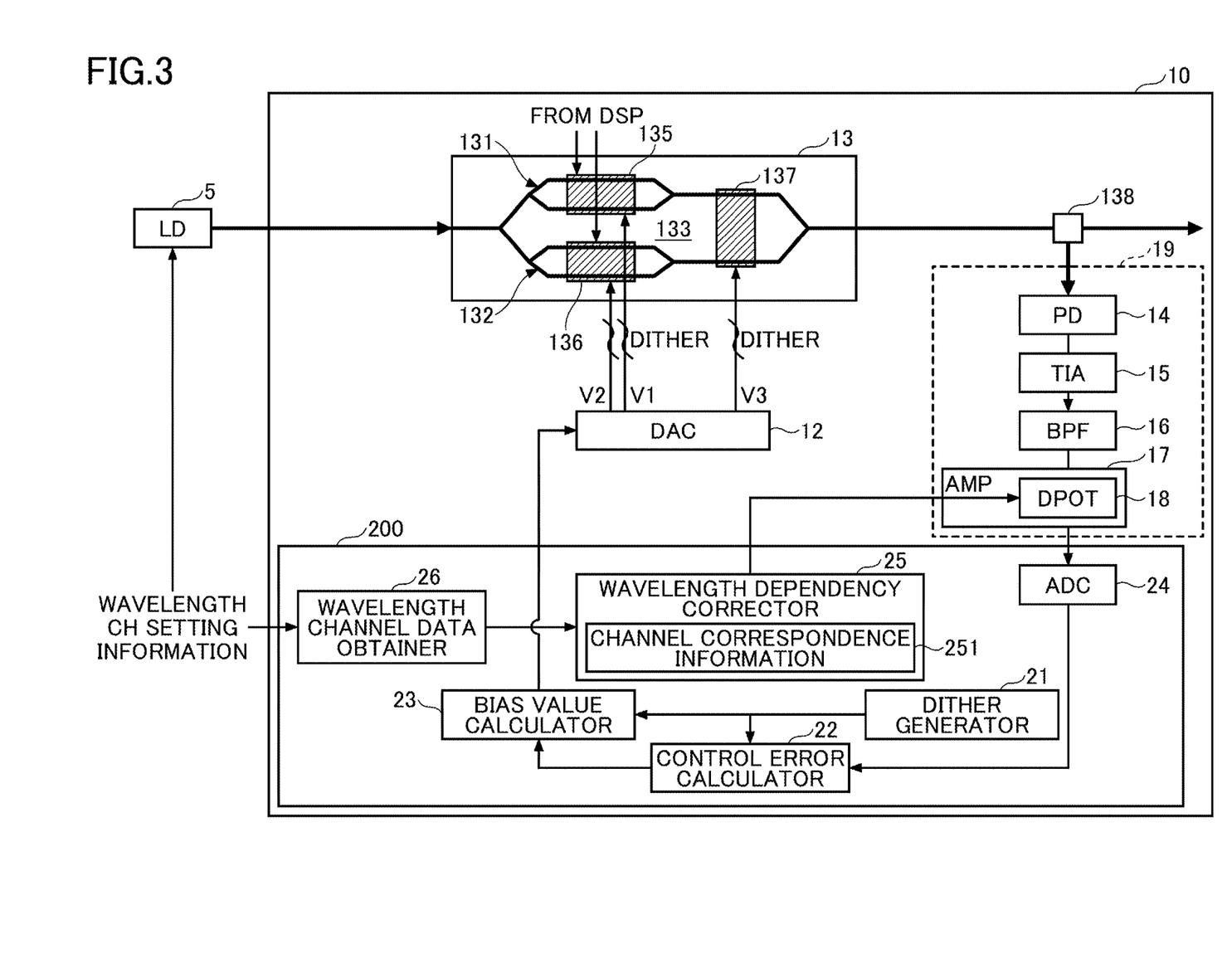
FIG. 3 is a schematic diagram of an optical transmitter according to an embodiment.

FIG. 2 is a schematic diagram of an optical transceiver module 1 including an optical transmitter 10 according to an embodiment; and FIG. 3 is a schematic diagram of the optical transmitter 10. A normal solid line with an arrow indicates an electric signal, and a thick solid line with an arrow indicates a path of light. The optical transceiver module 1 is an optical transceiver adopting a digital coherent scheme, that combines coherent reception and digital signal processing. The optical transceiver module 1 includes a digital signal processor (DSP) 2, a light source (denoted as "LD" in the FIG. 5, an optical transmitter 10, and an optical receiver 30. The optical transmitter 10 includes an optical modulator 13 and a microprocessor 20 to control the DC bias of the optical modulator 13. The optical modulator 13 is a modulator using an InP-based material.

The optical transceiver module 1 is connected to optical fibers 6 and 7. The optical transmitter 10 is connected to the optical fiber 6, to transmit an optical signal to a transmission line. The optical receiver is connected to the optical fiber 7, to receive an optical signal from a transmission line. Light emitted from the light source 5 is supplied to the optical transmitter 10 and the optical receiver 30. Light supplied to the optical transmitter 10 is incident on the optical modulator 13 as a carrier wave, and an optical signal modulated by the optical modulator 13 is output to the optical fiber 6. Light supplied to the optical receiver 30 is used as local light to detect an optical signal received from the optical fiber 7.

Referring to FIG. 3, the optical transmitter 10 includes a digital-to-analog converter (DAC) 12, an optical modulator 13, a bias controller 200 to control a DC bias applied to the optical modulator 13, and a monitor 19 to monitor the output light of the optical modulator 13. The bias controller 200 is implemented by functions of the microprocessor 20. The monitor 19 includes a photodetector (PD) 14, a transimpedance amplifier (TIA) 15, a band-pass filter (BPF) 16, and an electric amplifier 17. The PD 14 detects output light from the optical modulators 13. The TIA 15 converts a photocurrent output from the PD 14 into a voltage signal. The BPF 16 passes fluctuation components of predetermined frequencies included in a voltage signal output from the TIA 15. The electric amplifier 17 amplifies the fluctuation components of the frequencies extracted by the BPF 16.

The optical modulator 13 is an optical modulator of a Mach-Zehnder type, in which two child MZMs 131 and 132 are connected in parallel to form a parent MZM 133. A phase shift of 90 degrees is provided between light passing through the child MZM 131 and light passing through the child MZM 132. One of the child MZMs 131 and 132 acts as an in-phase (I) channel and the other acts as a quadrature (Q) channel, to form a phase-modulated IP-modulator.

The child MZMs 131 and 132 and the parent MZM 133 are provided with electrodes 135, 136, and 137, respectively. At radio-frequency (RF) terminals of the electrodes 135 and 136, a data signal generated by the DSP 2 is input as a high speed drive signal. Light incident on the I channel and the Q channel of the optical modulator 13 from the light source 5 is modulated by the data signal in the respective channels. Light modulated by the child MZM 131 and light modulated by the child MZM 132 are provided with a phase shift of 90 degrees from each other, and then, multiplexed to be output from the optical modulator 13 as an optical signal having four phase states.

A DC bias is applied to DC terminals of the electrodes 135, 136, and 137. A bias voltage V1 is applied to the DC terminal of the electrode 135 of the child MZM 131, and a bias voltage V2 is applied to the DC terminal of the electrode 136 of the child MZM 132. A bias voltage V3 is applied to the DC terminal of the electrode 137 of the MZM 133. The bias voltages V1, V2, and V3 are controlled to appropriate operating points by the bias controller 200. In the optical modulator 13 that modulates the optical phase, the bias voltages V1 and V2 of the child MZMs 131 and 132 are controlled to a null point where the output power of the optical modulator becomes minimum in a state of no data signal being input. The bias voltage V3 of the parent MZM 133 is set so as to provide a phase shift of 90 degrees between light passing through the child MZM 131 and light passing through the child MZM 132.

Figure 4:
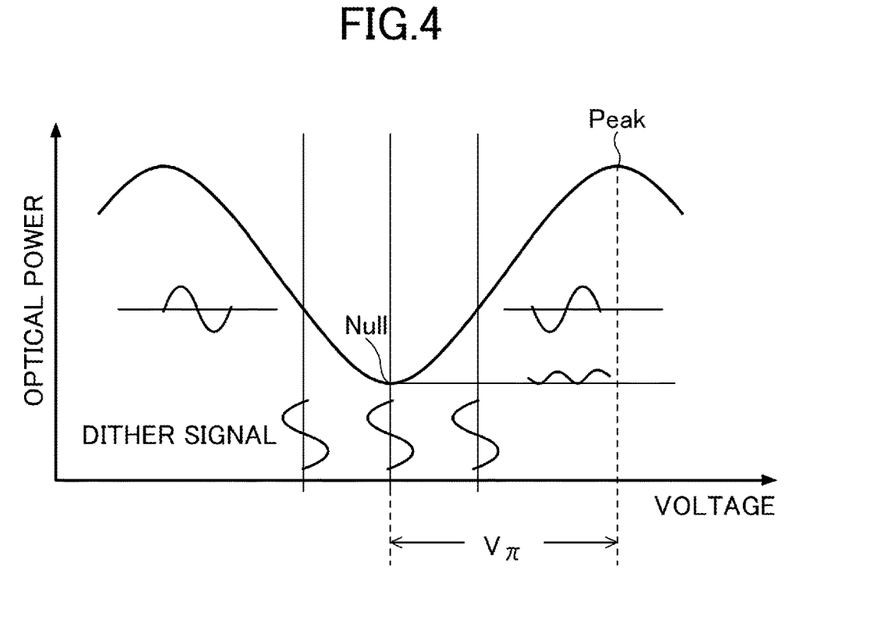
FIG. 4 is a diagram illustrating a voltage-to-optical power characteristic of an MZM.

FIG. 4 illustrates a voltage-to-optical power characteristic of an MZM. This voltage-to-optical power characteristic is also referred to as an extinction curve, where the horizontal axis represents the applied bias voltage, and the vertical axis represents the output power of the MZM. The bias voltages V1 and V2 are set so as to make the phases of light rays propagating through the two arms of the MZM have reversed phases of 180 degrees apart from each other. By providing a phase difference of 180 degrees between the two arms, when light rays passing through the respective two arms are multiplexed, the light rays cancel each other to make the output of the MZM minimum. A point at which the output power of the MZM becomes minimum will be referred to as a null point. When light rays passing through the respective two arms are in phase, the light rays intensify each other once multiplexed, to make the output of the MZM become maximum (peak). A drive voltage required to change the output of the MZM from the minimum to the maximum will be referred to as the half-wave voltage Vπ.

The InP-based optical modulator 13 has wavelength dependency, and in particular, in the case where the transmission band is widened, the relationship between the voltage and the phase is not necessarily linear. Therefore, in the optical modulator 13, although the bias voltage is adjusted so as to make the half-wave voltage Vπ constant as far as possible over the bandwidth, the wavelength dependency of the insertion loss still remains. In other words, the optical power output from the optical modulator 13 fluctuates depending on the wavelength, and the fluctuation in the optical power affects the accuracy and convergence time of the ABC control. Therefore, the ABC control is executed so as to cancel the wavelength dependency of the insertion loss.

The bias control itself uses a low-frequency dither signal as practiced conventionally. A dither signal varying at a frequency of several tens of Hz to several hundreds of Hz is superimposed on the bias voltages V1, V2, and V3. The superimposed dither signal appears as a minute fluctuation in the amplitude of a high-speed optical signal generated at each MZM. As illustrated in FIG. 4, when the bias voltage deviates from the operating point (e.g., the null point) of the optical modulator 13, a dither component that fluctuates at the same frequency as the dither signal is observed in the output light of the optical modulator 13. Depending on the direction of a shift of the bias voltage, the phase of the observed dither component is the same as or reverse to the dither signal.

In order to observe the dither component, part of light output from the optical modulator 13 is branched at a tap 138 to be detected by the PD 14. A photocurrent output from the PD 14 is converted into a voltage signal by the TIA 15, and a component fluctuating at the same frequency as the dither signal is extracted by the BPF 16. The fluctuation component (referred to as a "dither component") that changes at the same frequency as the dither signal is amplified by the electric amplifier 17. The gain of the electric amplifier 17 is adjusted by a digital potentiometer (DPOT) 18.

In the case where the bias voltage of the child MZM is at the null point, i.e., at the bottom of the voltage-to-optical power characteristic, the phase of the dither component is reversed by 180 degrees around the null point at the center, and a frequency twice the dither frequency is observed. When the bias voltage deviates from the null point, a dither component having the same frequency as that of the dither signal is observed, and a phase difference occurs between the dither component and the dither signal depending on the extent of the bias deviation. The ABC control controls the bias voltage so as to make the phase difference between the dither component and the dither signal zero or minimum.

However, if the wavelength dependency of the insertion loss of the optical modulators 13 is great, the power of the monitor light detected by the PD 14 fluctuates significantly between a wavelength having a great loss and a wavelength having a small loss, and the level of the monitor signal input into the bias controller 200 fluctuates depending on the wavelengths. The fluctuation in the input level to the bias controller 200 affects the accuracy and speed of convergence of the ABC control loop that corrects an advance or lag of the phase of the optical signal. For example, in the case where a wavelength in the vicinity of 1560 nm is used and the input level to the bias controller 200 is significantly reduced, the phase shift of the dither component with respect to the dither signal cannot be precisely detected, and thereby, the ABC control does not converge. Alternatively, the extinction point is not fixed in the ABC control loop, and the convergence time becomes very long. Meanwhile, if a wavelength in the vicinity of 1530 nm is used and the optical power incident on the PD 14 is too high, concerns may arise such as an occurrence of a dead zone due to output saturation of the electric amplifier 17, and an abnormal oscillation due to an excessive control gain.

In order to suppress such deterioration of the bias control, in an embodiment, the gain of the monitor signal generated by the monitor 19 is adjusted according to the wavelength in the previous stage of the ABC control. In the configuration example illustrated in FIG. 3, the DPOT 18 of the electric amplifier 17 is used for correcting the gain of the monitor signal in a direction in which the wavelength dependency of the insertion loss of the optical modulator 13 is canceled at a preceding stage before being input into the bias controller 200.

The bias controller 200 includes a dither generator 21, a control error calculator 22, a bias value calculator 23, an analog-to-digital converter (ADC) 24, a wavelength dependency corrector 25, and a wavelength channel data obtainer 26. The dither generator 21 generates a dither signal to be superimposed on the bias voltages V1, V2, and V3. As an example, a dither signal of 300 Hz is generated. The dither signal is supplied to the DAC 12 together with DC bias values for the respective MZMs determined by the bias value calculator 23, converted to an analog electric signal, and applied to the electrodes 135, 136 and 137 of the corresponding MZMs. When starting the ABC control, V1, V2, and V3 may be set to predetermined voltage values as initial bias values.

The output light of the optical modulator 13 is monitored by the monitor 19 in a state of having a dither signal superimposed. The monitor signal input into the bias controller 200 is converted into a digital signal by the ADC 24 and input into the control error calculator 22. The ADC 24 may be provided outside the bias controller 200. In this case, the digital monitor signal is input into the bias controller 200.

The control error calculator 22 synchronously detects a dither component included in the monitor signal by using the dither signal generated by the dither generator 21, and calculates a control error of the DC bias from an advance or lag of the phase. The calculated control error is supplied to the bias value calculator 23 and added to the current bias value, to update the bias value in a direction in which the control error is reduced. For example, when the phase of the fluctuation (dither) component included in the monitor signal is in phase with the dither signal superimposed on the DC bias, the bias value is updated in a direction in which the DC bias decreases toward the null point (the phase point of π/2 in the case of the parent MZM). When the phase of the fluctuation (dither) component included in the monitor signal is in reverse phase with the dither signal superimposed on the DC bias, the bias value is updated in a direction in which the DC bias increases toward the null point (the phase point of π/2 in the case of the parent MZM).

The bias voltages V1, V2, and V3 having the updated bias values are applied to the optical modulator 13, and the loop of the ABC control is repeatedly executed until the control error (phase difference) becomes minimum. The ABC control of the child MZMs 131 and 132 and the parent MZM 133 may be executed in a time division manner, or may be simultaneously executed in parallel by providing the bias controller 200 for each MZM.

As a feature of the embodiment, information on a currently used wavelength channel is supplied to the light source 5, as well as, input into the bias controller 200. Once having obtained the information on the current wavelength channel, the wavelength channel data obtainer 26 supplies the wavelength channel information to the wavelength dependency corrector 25. The wavelength dependency corrector 25 refers to the channel correspondence information 251, to correct the gain of the monitor signal in a direction in which the insertion loss generated according to the current wavelength is compensated. For example, the correction value determined by the wavelength dependency corrector 25 is supplied to the electric amplifier 17, and the gain of the electric amplifier 17 is adjusted according to the wavelength.

The channel correspondence information 251 used by the wavelength dependency corrector 25 is stored in a memory embedded in the microprocessor 20 (see FIG. 2) or in an external memory. The channel correspondence information may be in a form of a look-up table (LUT) in which a compensation value corresponding to each channel (wavelength) is described, or may be a function that defines the compensation value as a function of the wavelength.

Figure 5:
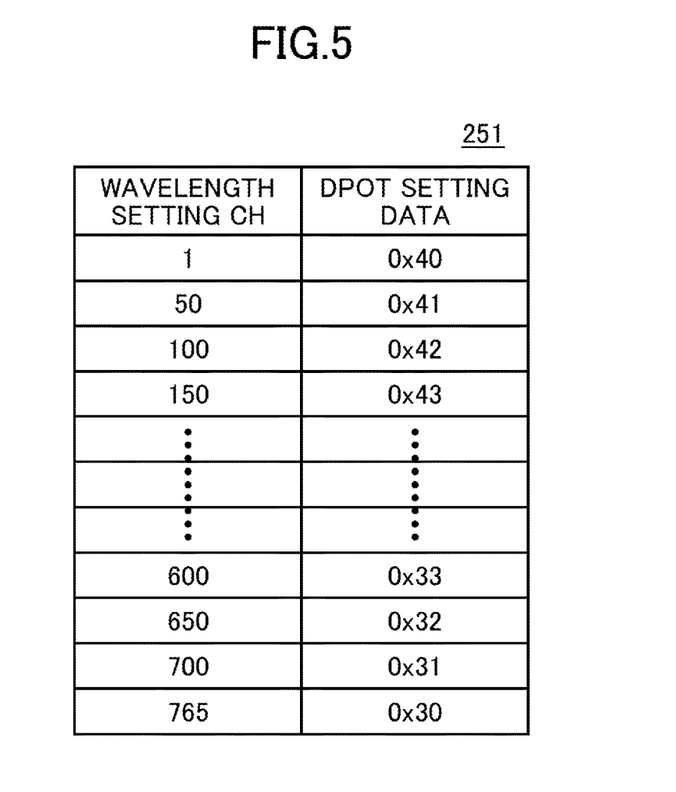
FIG. 5 is a diagram illustrating an example of channel correspondence information.

FIG. 5 illustrates an example of channel correspondence information 251. This channel correspondence information 251 is stored as an LUT in which a wavelength setting channel and an insertion loss compensation value are associated with each other. In the optical transmitter 10 in FIG. 3, the insertion loss is compensated by using a variable resistor of the DPOT 18 of the electric amplifier 17; therefore, the DPOT setting value is described as a compensation value of the insertion loss. By changing the variable resistance value of the DPOT 18 depending on the channel, the gain of the electric amplifier 17 is changed to compensate for the insertion loss that fluctuates depending on the wavelength.

In an LUT in FIG. 5, a setting value of the DPOT 18 is described for every 50 channels. If the wavelength dependency of the transmission loss of each MZM forming the optical modulator 13 can be simulated, the data of the DPOT setting values may be thinned out at predetermined channel intervals. The DPOT setting values for the thinned-out channels are calculated by, for example, linear interpolation. Depending on the channel range, i.e., the range of band, different linear interpolation equations may be used. For example, the slope of linear interpolation may be made greater in a region on the longer wavelength side with respect to the center wavelength of the band than in a region on the shorter wavelength side. Instead of the LUT in FIG. 5, all channels may be divided into multiple channel groups, and a functional expression may be held for each channel group.

In either configuration, the insertion loss of the optical modulator 13 that fluctuates depending on the wavelength is corrected by the gain of the electric amplifier 17, and the wavelength dependency of the insertion loss is compensated before entering the ABC control. Accordingly, deterioration of the convergence accuracy and increase of the convergence time of the ABC control can be suppressed.

<Bias Control Method and Correction of Wavelength Dependency of Insertion Loss>

Figure 6:
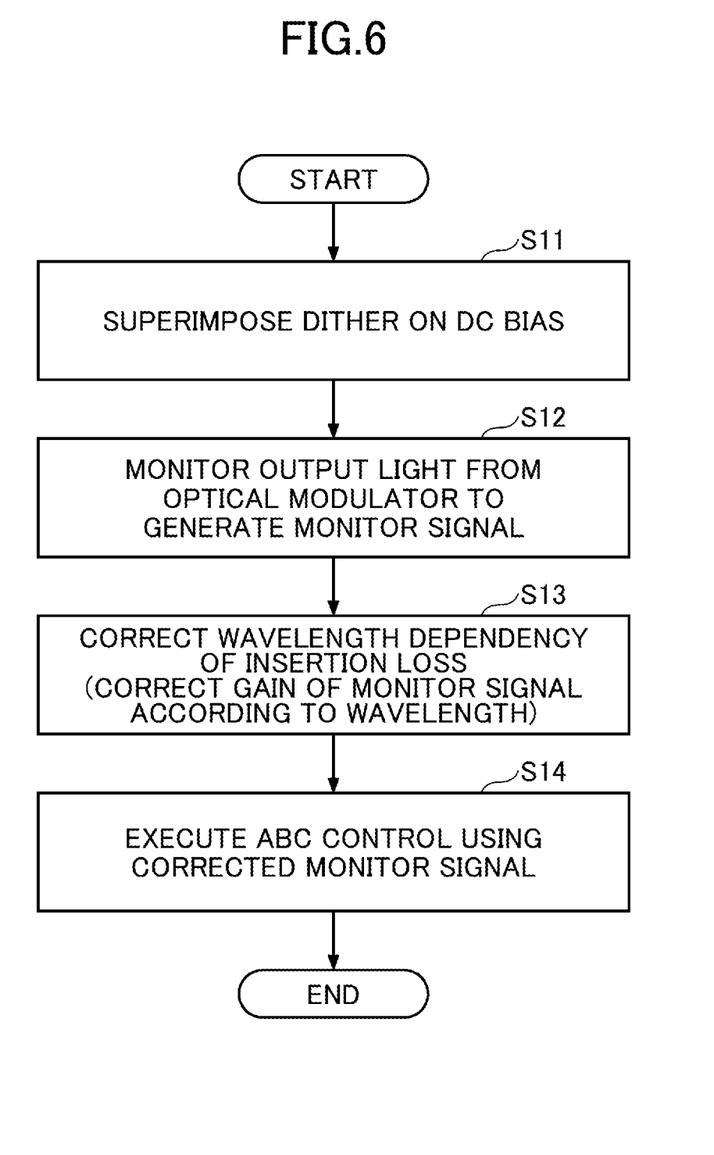
FIG. 6 is a flow chart of bias control according to an embodiment.

FIG. 6 is a flow chart of bias control according to an embodiment. This control flow is executed upon initial activation or upon change in wavelength. The bias control is executed for each of the child MZMs 131 and 132 and the parent MZM 133. In FIG. 6, attention is paid to bias control for the child MZM 131. First, input of a dither signal to the child MZM 132 is turned off, and the bias voltage V1 having the dither signal superimposed is applied to the DC terminal of the electrode 135 of the child MZM 131 (Step S11). By having the dither signal superimposed, the output light of the optical modulator 13 includes a dither component that fluctuates at the same frequency as the dither signal. The dither component has a phase difference corresponding to the deviation of the bias voltage V1 from the null point with respect to the dither signal.

The monitor 19 monitors the output light from the optical modulator 13 to generate a monitor signal (Step S12). As described above, as long as the insertion loss of the optical modulator 13 is constant over the transmission band, the monitor signal output from the electric amplifier 17 may be supplied to the ABC control as it is. However, in the InP-based optical modulators 13, the insertion loss fluctuates significantly depending on the wavelength; therefore, the wavelength dependency of the insertion loss is corrected (Step S13) at the preceding stage of the ABC control. Specifically, the gain of a monitor signal is adjusted according to the wavelength.

The ABC control is executed using the gain-adjusted monitor signal (Step S14). The ABC control controls the bias voltage V1 of interest in a direction in which the phase shift of the dither component from the dither signal is reduced. Accordingly, the DC bias is controlled to or around the operating point.

Figure 7:
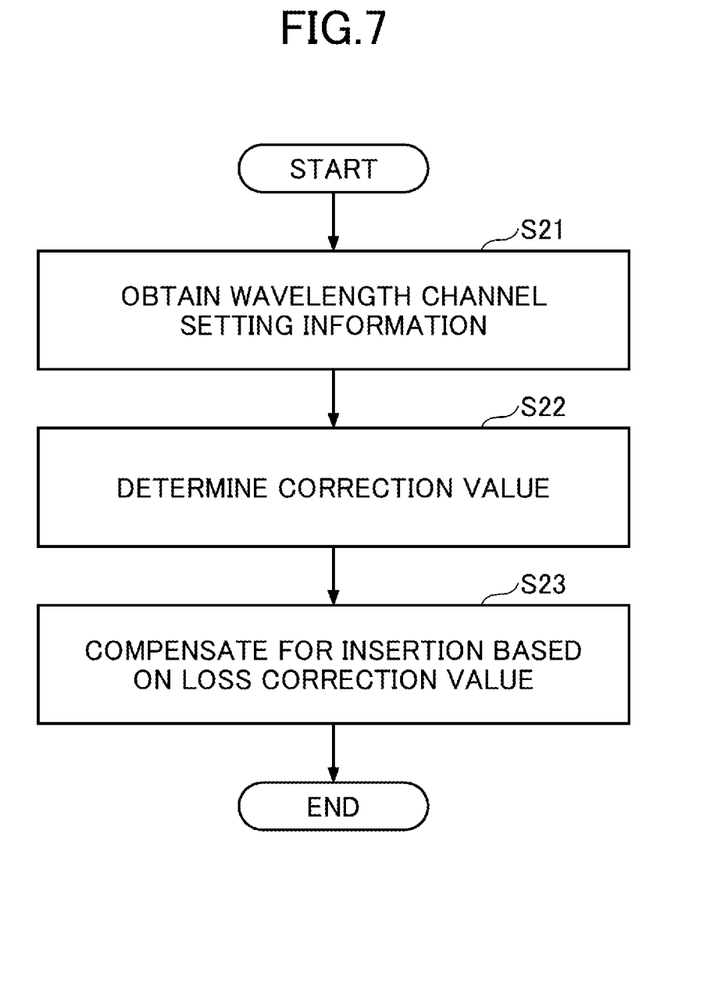
FIG. 7 is a flow chart of wavelength dependency correction.

FIG. 7 is a flow chart of wavelength dependency correction executed as Step S13 in FIG. 6. The correction of the wavelength dependency of the insertion loss is executed by the wavelength dependency corrector 25, i.e., by the microprocessor 20. First, wavelength channel setting information is obtained (Step S21). The wavelength channel setting information may be a wavelength channel selected by a user, or in the case of optical communication of a wavelength division multiplexing (WDM) system, may be a current setting wavelength of a wavelength variable laser array of the light source 5.

Based on the current wavelength, a correction value to compensate for the fluctuation in the insertion loss is determined (Step S22). For example, the variable resistance value of the DPOT 18 or the gain value of the electric amplifier 17 serves as the correction value. The correction value is not limited to the setting value of the DPOT 18, and as will be described later, the gain of the TIA 15 may be adjusted, or the digital gain may be adjusted in the latter stage of the ADC 24.

The wavelength dependency of the insertion loss is compensated based on the determined correction value (Step S23). For example, in the case where a wavelength in the vicinity of 1565 nm is used, the variable resistance value of the DPOT 18 is set so as to make the gain of the electric amplifier 17 greater. In the case where a wavelength in the vicinity of 1528 nm is used, the variable resistance value of the DPOT 18 is set so as to make the gain of the electric amplifier 17 smaller. Accordingly, the wavelength dependency of the insertion loss is compensated.

Figure 8:
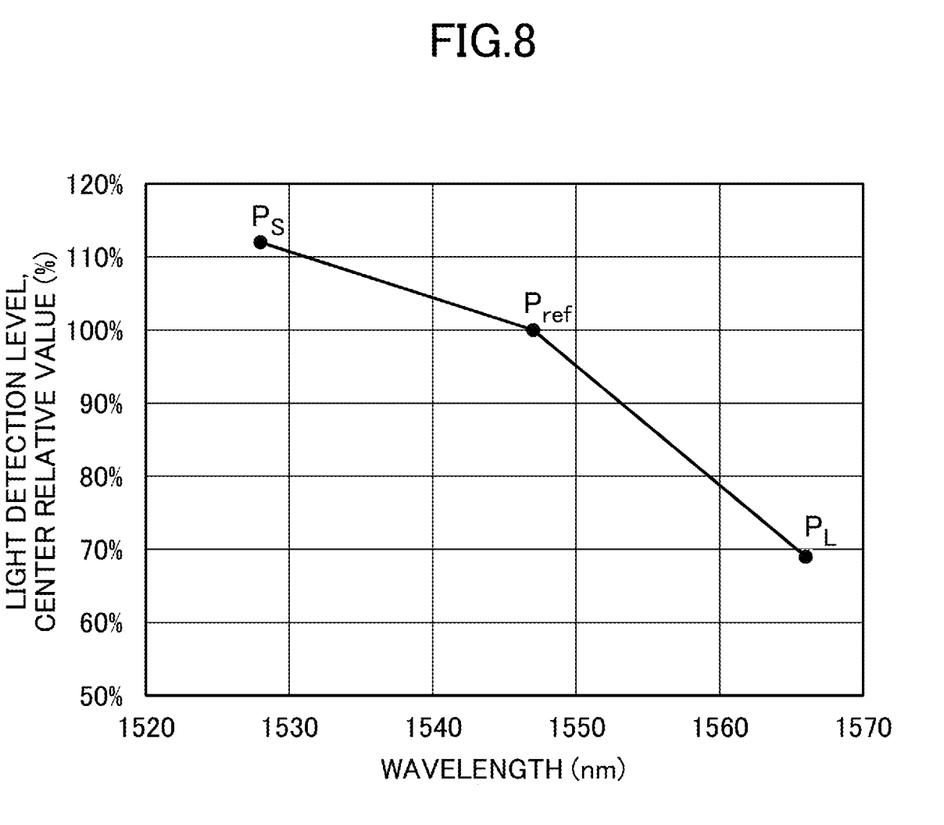
FIG. 8 is a diagram illustrating an example of correction value determination.

FIG. 8 illustrates an example of correction value determination. On the longer wavelength side and on the shorter wavelength side with respect to the center of the band as the boundary, correction values of the wavelength dependency of the insertion loss are calculated by linear interpolation In this example, a value to be corrected is the setting value of the DPOT 18. First, the variable resistance value of the DPOT 18 is set so as to obtain a specified ABC controlled gain at the center wave length $\lambda_{ref}$ (1547 nm in this example). The DPOT setting value at this time is set to $DPOT_{ref}$. When the setting value of DPOT 18 is set to $DPOT_{ref}$, the light detection level at the center wave length $\lambda_{ref}$ is defined as $P_{ref}=100\%$.

The light detection level of a wavelength $\lambda_S$ shorter than the center wavelength $\lambda_{ref}$ is denoted as $P_S$, and the light detection level of a wavelength $\lambda_L$ longer than the center wavelength $\lambda_{ref}$ is denoted as $P_L$. In the wavelength-to-light detection level characteristic (or wavelength-to-insertion loss characteristic) in FIG. 6, when $P_{ref}$ is 100%, $P_S$ at 1528 nm is 112% and $P_L$ at 1566 nm is 69%.

On the shorter wavelength side and on the longer wavelength side, correction coefficients based on the center wavelength A ref are calculated Correction coefficient at 1528 nm: $P_{ref}/P_S=100/112=0.89$ Correction coefficient at 1566 nm: $P_{ref}/P_L=100/69=1.45$ By using the above compensation coefficients, a setting value DPOT($\lambda_T$) of the DPOT 18 at a target wave length $\lambda_T$ is calculated by interpolation on each of the shorter wavelength side and the longer wavelength side.

Shorter wavelength side:

$$DPOT(\lambda_T) = DPOT_{ref} \times [(0.89 - 1.00)/(\lambda_s - \lambda_{ref})(\lambda_T - \lambda_{ref}) + 1]$$
$$= DPOT_{ref} \times [(0.89 - 1.00)/(1528 - 1547)(\lambda_T - 1547) + 1]$$

Longer wavelength side:

$$DPOT(\lambda_T) = DPOT_{ref} \times [(1.45 - 1.00)/(\lambda_L - \lambda_{ref})(\lambda_T - \lambda_{ref}) + 1]$$
$$= DPOT_{ref} \times [(1.45 - 1.00)/(1566 - 1547)(\lambda_T - 1566) + 1]$$

In this way, at the preceding stage of being input into the ABC control, the gain of the monitor signal of the optical modulator 13 operating at any wavelength can be corrected in a direction in which the wavelength dependency of the insertion loss is canceled. A situation in which the power of the monitor signal becomes excessive or significantly decreases depending on the wavelength can be prevented, and the convergence accuracy or the convergence time of the ABC control can be maintained within an allowable range.

Figure 9:
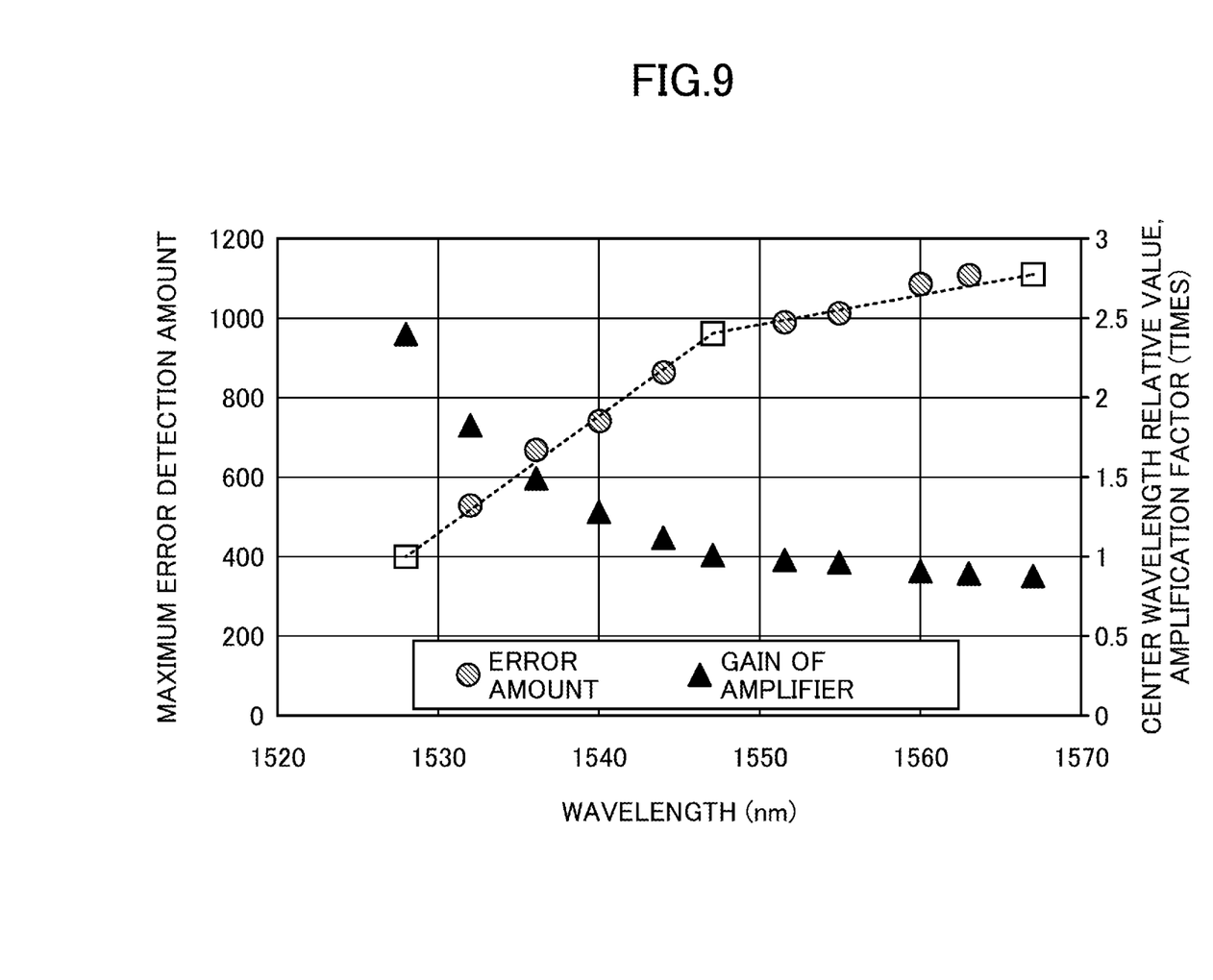
FIG. 9 is a diagram illustrating a correction example of compensating for the wavelength dependency of insertion loss.

FIG. 9 is a diagram illustrating a correction example of compensating for the wavelength dependency of insertion loss. The horizontal axis represents the wavelength, the left vertical axis represents the maximum error detection amount, and the right vertical axis represents the amplification factor of the electric amplifier 17. The amplification factor at the center wavelength $\lambda_{ref}$ is regarded as the unit factor (factor of 1). A shaded circle indicates an error amount, and a black triangle mark indicates a gain (amplification factor) of the electric amplifier 17. Square marks indicate measured values of error amounts at three points of the center wavelength $\lambda_{ref}$, the short wavelength ($\lambda_S$), and the long wavelength ($\lambda_L$), respectively, and a dotted line indicates a fitting line obtained by linear interpolation on the shorter wavelength side and the longer wavelength side based on the measured values at the three points.

Actual measurement values of the error amounts coincide with the fitting line well. With the setting of the gain of the electric amplifier 17 at the center wavelength A ref as a factor of 1, the DPOT setting value is determined so as to make the maximum error detection amount substantially constant over the entire band. The gain characteristic of the electric amplifier 17 at this time decreases nonlinearly toward the longer wavelength side as indicated by the triangle marks. Accordingly, at the preceding stage of the ABC control, the gain of the monitor signal representing the dither component is corrected in a direction in which the wavelength dependency of the insertion loss is eliminated.

Modified Examples

Figure 10:
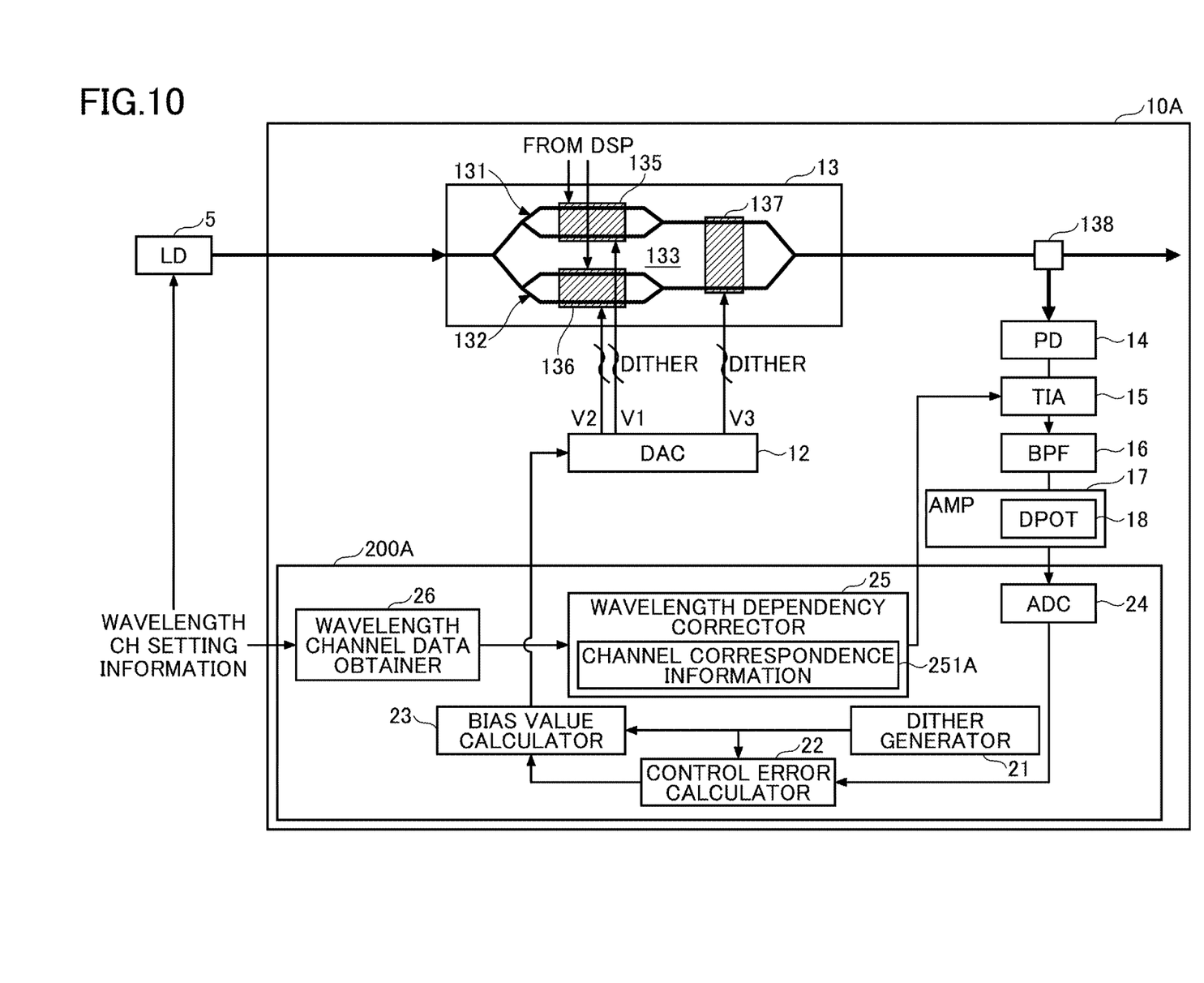
FIG. 10 is a schematic diagram of a modified example of an optical transmitter.

FIG. 10 is a schematic diagram of a modified example of an optical transmitter 10A. In the optical transmitter 10A, the gain of the TIA 15 is adjusted at the preceding stage of the ABC control to correct the wavelength dependency of the insertion loss. The wavelength dependency corrector 25 of the bias controller 200A has a gain setting value of the TIA corresponding to each channel as a correction value, as the channel correspondence information 251A. As illustrated in FIG. 5, gain setting values of the TIA may be described corresponding to channels at predetermined intervals. The TIA gain between the channels may be calculated by linear interpolation. The amplification factor of the TIA 15 is adjusted based on the correction values determined for the respective wavelengths by the wavelength dependency corrector 25, and a voltage signal in which the wavelength dependency of the insertion loss is corrected over the transmission band is input into the BPF 16.

As the photocurrent of the PD 14 input into the TIA 15 is minute, it is desirable to take measures against noise, such as minimizing the length of the electric wiring of the printed circuit substrate that connects the output of the PD 14 to the input of the TIA 15. The other elements of the optical transmitter 10A and the bias controller 200A are as described with reference to FIG. 3. Also, in the configuration of the optical transmitter 10A, the wavelength dependency of the insertion loss of the optical modulators 13 can be corrected at the preceding stage of the ABC control, to suppress the deterioration of the convergence accuracy or the increase of the convergence time of the ABC control.

Figure 11:
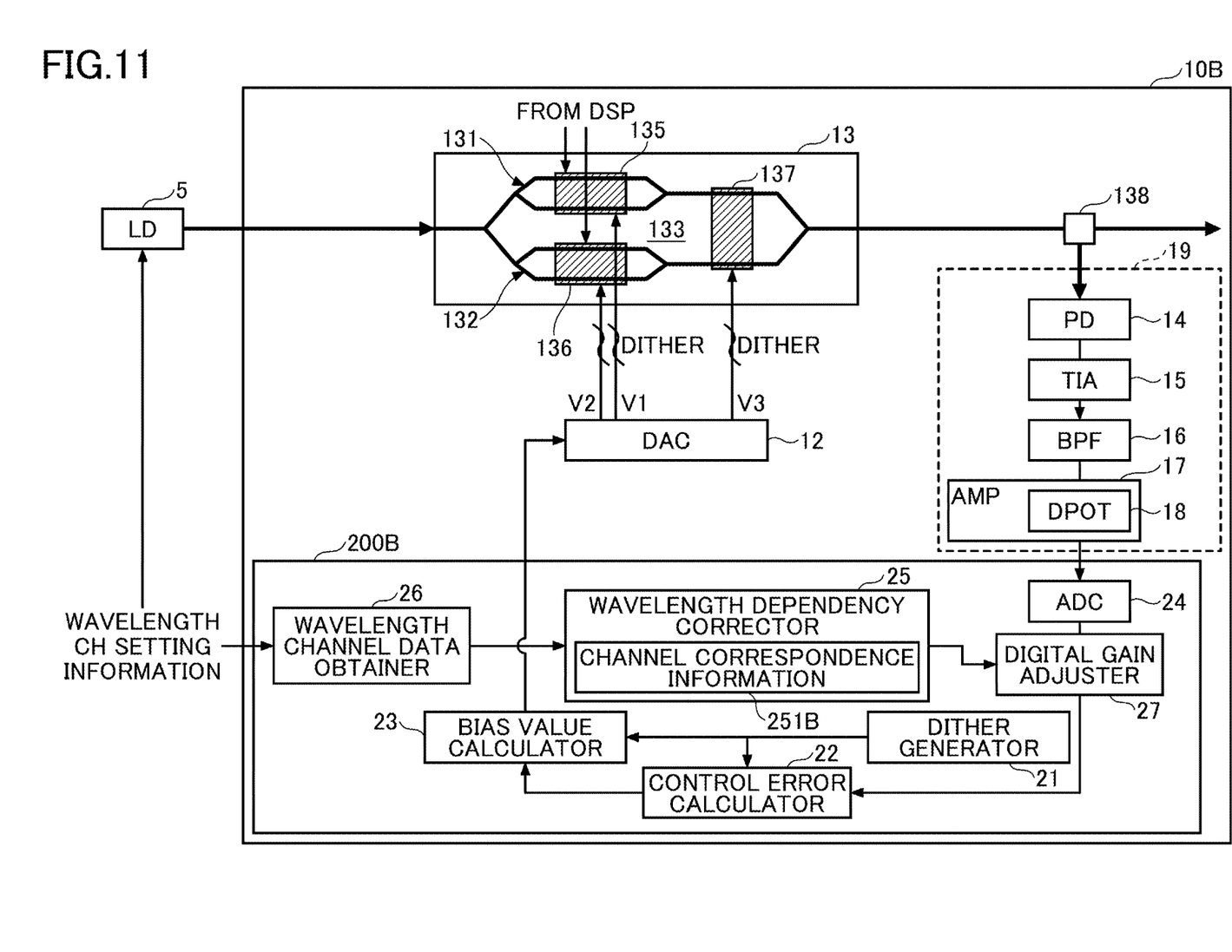
FIG. 11 is a schematic diagram of another modified example of the optical transmitter.

FIG. 11 is a schematic diagram of an optical transmitter 10B as another modified example. A bias controller 200B of the optical transmitter 10B includes a digital gain adjuster 27 connected to the output of the ADC 24. By digitally adjusting the gain of the monitor signal, the wavelength dependency of the insertion loss is corrected at the preceding stage of the ABC control. In the wavelength dependency corrector 25, as channel correspondence information 251B, a setting value (coefficient) of a digital gain corresponding to each channel is described. As illustrated in FIG. 5, digital gain setting values may be described corresponding to channels at predetermined intervals. A digital gain value between the channels may be linearly interpolated. The digital monitor signal is amplified by the wavelength dependency corrector 25, based on the digital gain coefficient determined for each wavelength. A digital monitor signal having the wavelength dependency of the insertion loss corrected over the transmission band is input into the control error calculator 22.

The gain adjustment by the digital processing is simple. In the case of using the configuration illustrated in FIG. 11, it is desirable to set an analog gain of the electric amplifier 17 to a maximum level that is not saturated by input into the ADC 24. By limiting the analog gain of the electric amplifier 17, although the dynamic range of the ADC 24 is somewhat limited, by optimizing the signal-to-noise characteristic, the wavelength dependency of the insertion loss can be corrected to suppress the deterioration of the convergence accuracy or the increase of the convergence time of the ABC control.

As above, the present disclosure has been described based on specific configuration examples; note that the present disclosure is not limited to the configuration examples described above. The light source 5 may be provided inside the optical transmitter 10. Correction values described in the channel correspondence information 251 may be described as coefficients for adjusting the amplification factor of the monitor signal. As the frequency of a dither signal, any frequency such as 100 Hz, 200 Hz, or the like can be used as long as the frequency of the dither signal is sufficiently lower than that of the analog drive signal driving the optical modulators 13. In the case where the functions of bias controller 200 corresponding to the child MZMs 131 and 132 and the parent MZM 133 are implemented by the microprocessor 20, dither signals having different frequencies may be applied to the child MZMs 131 and 132 and the parent MZM 133. Also, in this case, by adjusting the gain of the monitor signal according to the wavelength at the preceding stage of the DC bias control of an MZM of interest, the monitor signal having the wavelength dependency of the insertion loss corrected over the transmission band can be supplied to the ABC control.

As the modulating scheme of the optical modulators 13, dual polarization (DP) QPSK modulation may be executed, in which two parent MZMs 133 are connected in parallel using quadrature phase shift keying (QPSK), quadrature amplitude modulation (QAM), or the like. In this case, the ABC control is executed on each of an optical modulator for an X-polarized wave and an optical modulator for a Y-polarized wave, and the gain of the monitor signal of the output light of the optical modulator for each polarized wave is adjusted according to the wavelength at the preceding stage of the ABC control.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmitter comprising:
   an optical modulator of a Mach-Zehnder type using an InP-based material;
   a bias controller configured to control a DC bias applied to the optical modulator;
   a monitor configured to monitor output light of the optical modulator to generate a monitor signal; and
   a corrector configured to adjust a gain of the monitor signal such that wavelength dependency of insertion loss of the optical modulator is compensated according to a target wavelength, prior to bias control by the bias controller.

2. The optical transmitter as claimed in claim 1, wherein the monitor includes
   a photodetector configured to detect part of the output light of the optical modulator,
   a transimpedance amplifier configured to convert a photocurrent obtained by the photodetector into a voltage signal,
   a band-pass filter configured to extract a predetermined frequency component included in the voltage signal that is output from the transimpedance amplifier, and
   an electric amplifier configured to amplify the predetermined frequency component extracted by the band-pass filter,
   wherein the corrector is configured to adjust a gain of the electric amplifier according to the target wavelength.

3. The optical transmitter as claimed in claim 1, wherein the monitor includes
   a photodetector configured to detect part of the output light of the optical modulator,
   a transimpedance amplifier configured to convert a photocurrent obtained by the photodetector into a voltage signal,
   a band-pass filter configured to extract a predetermined frequency component included in the voltage signal that is output from the transimpedance amplifier, and
   an electric amplifier configured to amplify the predetermined frequency component extracted by the band-pass filter,
   wherein the corrector is configured to adjust a gain of the transimpedance amplifier according to the target wavelength.

4. The optical transmitter as claimed in claim 1, wherein the bias controller includes a digital gain adjuster configured to digitally adjust the gain of the monitor signal, and
   the corrector is configured to adjust a digital gain of the digital gain adjuster according to the target wavelength.

5. The optical transmitter as claimed in claim 1, wherein the bias controller includes a wavelength channel data obtainer configured to obtain setting information on a current wavelength channel, and
   the corrector is configured to determine a correction value for adjusting the gain of the monitor signal, based on the setting information obtained by the wavelength channel data obtainer.

6. The optical transmitter as claimed in claim 1, wherein the bias controller is configured to superimpose a dither signal on the DC bias applied to the optical modulator, and control a voltage value of the DC bias in a direction in which a phase error between a dither component included in the monitor signal having the adjusted gain and the dither signal is reduced.

7. A bias control method comprising:
   superimposing a dither signal on a DC bias of an optical modulator of a Mach-Zehnder type using an InP-based material; and
   monitoring output light of the optical modulator to generate a monitor signal including a dither component that fluctuates at a same frequency as the dither signal;
   adjusting a gain of the monitor signal according to a target wavelength so as to compensate for wavelength dependency of insertion loss of the optical modulator; and
   executing bias control of the optical modulator using the adjusted monitor signal.

8. The bias control method as claimed in claim 7, the method further comprising detecting part of the output light of the optical modulator by a photodetector, and adjusting a gain of a transimpedance amplifier configured to convert a photocurrent output from the photodetector into a voltage signal according to the target wavelength.

9. The bias control method as claimed in claim 7, the method further comprising extracting a dither component fluctuating at a same frequency as the dither signal from the output light of the optical modulator, and adjusting a gain of an electric amplifier amplifying the dither component according to the target wavelength.

10. The bias control method as claimed in claim 7, the method further comprising converting the monitor signal into a digital signal, and adjusting a digital gain of the digital signal according to the target wavelength.

* * * * *